(12) United States Patent
Li et al.

(10) Patent No.: US 11,675,134 B1
(45) Date of Patent: Jun. 13, 2023

(54) OPTICAL BANDPASS FILTER BASED ON REFLECTIVE DEVICES

(71) Applicant: Skorpios Technologies, Inc., Albuquerque, NM (US)

(72) Inventors: Guoliang Li, Albuquerque, NM (US); Stephen B. Krasulick, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 17/306,801

(22) Filed: May 3, 2021

Related U.S. Application Data (60) Provisional application No. 63/019,107, filed on May 1, 2020.

(51) Int. Cl.
G02B 6/293 (2006.01)

(52) U.S. Cl.
CPC ....... *G02B 6/29389* (2013.01); *G02B 6/2931* (2013.01); *G02B 6/29346* (2013.01); *G02B 6/29395* (2013.01)

(58) Field of Classification Search
CPC .................................................. G02B 6/29389
See application file for complete search history.

(56) References Cited

U.S. PATENT DOCUMENTS

| | | | | |
|---|---|---|---|---|
| 6,466,345 B1 * | 10/2002 | Bousselet | .......... | H01S 3/06795 398/87 |
| 6,856,732 B2 * | 2/2005 | Liu | .......... | G02F 1/025 385/38 |
| 7,245,792 B2 * | 7/2007 | Liu | .......... | G02B 6/29317 385/24 |
| 7,330,658 B2 * | 2/2008 | Augustsson | ......... | G02B 6/4215 398/84 |
| 8,859,394 B2 | 10/2014 | Dallesasse et al. | | |
| 9,316,785 B2 | 4/2016 | Krasulick et al. | | |

OTHER PUBLICATIONS

"Distributed Bragg reflector", Wikipedia, last edited Mar. 19, 2021, retrieved from: https://en.wikipedia.org/wiki/Distributed_Bragg_reflector on Jun. 24, 2021, 4 pages.

\* cited by examiner

*Primary Examiner* — Omar R Rojas
(74) *Attorney, Agent, or Firm* — Kilpatrick Townsend & Stockton LLP (57) ABSTRACT

An optical bandpass filter includes an optical splitter having at least four ports, one of the ports being designated as an input port and one of the ports being designated as an output port. First and second reflectors couple with respective third and fourth ones of the ports. The splitter directs portions of the input light from the input port, into the third and fourth ports, such that the portions of the input light propagate toward the respective first and second reflectors. The first and second reflectors reflect light having wavelengths within a predetermined wavelength range, back toward the splitter, as wavelength-selected light, and transmit light having wavelengths that are outside of the predetermined wavelength range, away from the splitter. The splitter directs at least a portion of the wavelength-selected light that propagates back toward the splitter, into the output port, as output light.

20 Claims, 7 Drawing Sheets

OPTICAL BANDPASS FILTER BASED ON REFLECTIVE DEVICES

CROSS-REFERENCE TO RELATED APPLICATIONS

This application claims priority to U.S. Provisional Patent Application No. 63/019,107, filed on May 1, 2020, entitled "Optical Bandpass Filter Based On Reflective Waveguide Devices," the disclosure of which is hereby incorporated by reference in its entirety for all purposes.

BACKGROUND

This application relates to semiconductor photonics. Filters such as low pass, high pass, bandpass, polarization, and mode filters can be produced and/or used in many ways in optics. In photonic chips, such filters may be formed from waveguides. Desirable features for some such filters, depending on the intended application, may include frequency/wavelength tunability, high bandwidth (e.g., low insertion loss) for passed frequencies/wavelengths/modes/polarizations, high attenuation or blocking of rejected frequencies/wavelengths/modes/polarizations, presence or absence of polarization or mode dependence, and compatibility with material system(s) used to form the photonic chips.

SUMMARY

In one or more embodiments, an optical bandpass filter includes an optical splitter having at least four ports, a first one of the ports being designated as an input port and a second one of the ports being designated as an output port. A first reflector is operatively coupled with a third one of the ports, and a second reflector is operatively coupled with a fourth one of the ports. The optical splitter is configured to accept input light through the input port, direct at least a first portion of the input light into the third one of the ports, such that the first portion of the input light propagates toward the first reflector, and direct at least a second portion of the input light into the fourth one of the ports, such that the second portion of the input light propagates toward the second reflector. The first and second reflectors are configured to reflect light having wavelengths within a predetermined wavelength range, to propagate back toward the optical splitter, as wavelength-selected light, and to transmit light having wavelengths that are outside of the predetermined wavelength range, away from the optical splitter. The optical splitter is configured to direct at least a portion of the wavelength-selected light that propagates back toward the optical splitter, into the output port, as output light.

In one or more embodiments, an optical bandpass filter includes a splitter formed of silicon on an SOI substrate. The splitter includes a first port, wherein the first port is a silicon waveguide that acts as an input to the filter, a second port, wherein the second port is a silicon waveguide that acts as an output of the filter, a third port, wherein the third port is a silicon waveguide, and a fourth port, wherein the fourth port is a silicon waveguide. The optical bandpass filter further includes a first, wavelength-sensitive reflector optically coupled with the third port, and a second, wavelength-sensitive reflector optically coupled with the fourth port. The first and second wavelength-sensitive reflectors reflect light within a predetermined wavelength range back toward the splitter as reflected light, and the splitter directs at least a portion of the reflected light into the second port as output light.

In one or more embodiments, a method of bandpass filtering an optical communication channel includes coupling input light into an optical splitter; directing, with the optical splitter, at least a portion of the input light toward one or more reflectors; and reflecting, by the one or more reflectors, wavelengths of the portion of the input light that are within a predetermined wavelength range, back toward the optical splitter, as wavelength-selected light. The method further includes transmitting, by the one or more reflectors, light wavelengths that are outside of the predetermined wavelength range, away from the optical splitter, and directing, by the optical splitter, at least a portion of the wavelength-selected light into an output of the optical splitter, as bandpass filtered output light.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Embodiments are described in detail below with reference to the following figures, in which like numerals within the drawings and mentioned herein represent substantially identical structural elements.

DETAILED DESCRIPTION

The subject matter of embodiments of the present invention is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Each example is provided by way of illustration and/or explanation, and not as a limitation. For instance, features illustrated or described as part of one embodiment may be used on another embodiment to yield a further embodiment. Upon reading and comprehending the present disclosure, one of ordinary skill in the art will readily conceive many equivalents, extensions, and alternatives to the specific, disclosed examples, all of which are within the scope of embodiments herein.

In the following description, positional terms like "above," "below," "vertical," "horizontal" and the like are sometimes used to aid in explaining and specifying features illustrated in the drawings as presented, that is, in the orientation in which labels of the drawings read normally. These meanings are adhered to, notwithstanding that the apparatus described herein may be mounted and/or used in orientations that are different than those shown.

An optical bandpass filter with wide tunable range, flat-top bandwidth, low polarization dependence, low loss, use in thick silicon, and/or large out-of-band rejection ratio can be desirable for an optical filter for channel selection in an optical receiver module. For example, the receive module could be part of a Passive Optical Network (PON) or other multi-carrier application.

At present, some implementations for an optical bandpass filter often include using a ring resonator. However, ring resonators typically require a thin-silicon platform (herein, a thickness of crystalline silicon in a device layer of less than 1.0 micron is considered thin silicon, whereas a device layer thickness equal to or greater than 1.0 or 1.5 microns; and/or equal to or less than 10 microns is considered thick silicon). Further, ring resonators are typically very sensitive to light polarization. Another implementation is to use an optical circulator and a grating reflector. However, optical circulators can be difficult to manufacture on an optical chip. Thus there is a need for improvements to an optical bandpass filter in semiconductor photonics.

Figure 1A:
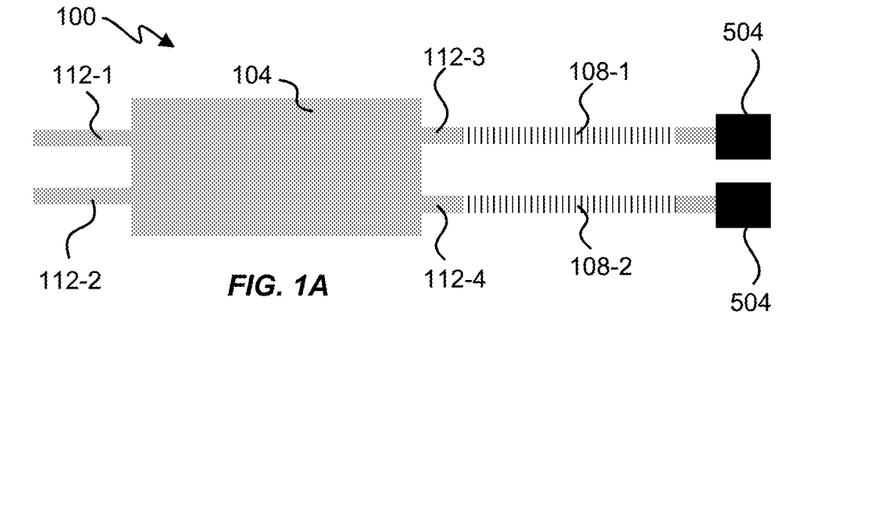
FIG. 1A schematically illustrates an embodiment of an optical bandpass filter, in accord with one or more embodiments.

Referring first to FIG. 1A, an embodiment of an optical bandpass filter 100 is schematically illustrated. Bandpass filter 100 includes an optical splitter 104, a first reflector 108-1, and a second reflector 108-2. Bandpass filter 100 may be formed from a silicon layer in a thick-silicon platform, although this is not required. A thick-silicon platform may be created, for example, on a silicon-on-insulator (SOI) wafer comprising a handle portion, a device layer (of single-crystal silicon), and a buried oxide ("BOX") layer (e.g., of silicon dioxide) between the handle portion and the device layer. The handle portion and the BOX layer, together, are considered a substrate with which the devices described herein are integrated, consistent with typical semiconductor and optoelectronic fabrication methods. Techniques for fabricating a SOI wafer with the handle portion, the device layer and the BOX layer are described in U.S. Pat. No. 8,859,394, which is incorporated herein by reference in its entirety for all purposes. Optical splitter 104 and reflectors 108 may be formed in the device layer of the thick-silicon platform (e.g., by etching). Optical bandpass filter 100 may be insensitive to optical polarization, although the techniques herein can be adapted to produce polarization sensitive bandpass filters.

In FIG. 1A, optical splitter 104 is a 2×2 multimode interference coupler (MMI), although it is possible to use other optical splitter devices in place of an MMI. For example, a 2×2 directional coupler could be used, although it may be more difficult to fabricate than the 2×2 multimode MMI shown herein, and may impose more bandwidth limitations.

Optical splitter 104 includes a first port 112-1, a second port 112-2, a third port 112-3, and a fourth port 112-4. First port 112-1 and second port 112-2 are on a first side of optical splitter 104, while third port 112-3 and fourth port 112-4 are on a second side of optical splitter 104, the second side being opposite to the first side.

Optical splitter 104, ports 112 and other features described herein can be implemented using waveguides etched from a thick-silicon platform. In this configuration, silicon features generated by etching away unwanted parts of a silicon layer act as a waveguide, with an underlying BOX layer acting as a lower cladding for the waveguide. Another silicon dioxide (and/or other dielectric) layer, deposited over the etched silicon features, acts as a top cladding for the waveguide. The silicon may be single-crystal silicon, polycrystalline silicon or amorphous silicon. Further information about techniques used to fabricate waveguides, integrate compound semiconductor chips within a photonic chip, and the like can be found in U.S. Pat. No. 9,316,785, which is incorporated herein by reference in its entirety for all purposes. When fabricated using such techniques, the devices described herein can be considered as semiconductor waveguide based devices integrated with an SOI substrate. However, upon reading and comprehending the present disclosure, one of ordinary skill in the art will readily conceive many equivalents, extensions, and alternatives to the specific, disclosed examples, such as implementing the bandpass filter described below with other forms of waveguides or light guides, or even in free space optics.

In the embodiment shown in FIG. 1, first port 112-1 acts as an input for optical splitter 104, and is configured to couple light into optical splitter 104. Second port 112-2 acts as an output for optical splitter 104, configured to couple light out of optical splitter 104. Third port 112-3 couples first reflector 108-1 to optical splitter 104 via a first input/output waveguide. Fourth port 112-4 couples second reflector 108-2 to optical splitter 104 via a second input/output waveguide.

To provide bandpass filter functionality, reflectors 108 provide reflectivity that varies as a function of the wavelength (frequency) of the input light. (In the discussions below, physical propagation and reflection effects are discussed as dependent upon wavelength, but performance as utilized in optical communication systems is discussed in terms of frequency. One skilled in the art appreciates the relationships between frequency, wavelength, refractive index and the like.) For example, reflectors 108 can be Bragg gratings etched into the material that forms third port 112-3 and fourth port 112-4. Thus, reflectors 108 will be wavelength-sensitive reflectors that reflect wavelengths within a predetermined wavelength range, which will often be a very narrow wavelength range. When the wavelength-sensitive reflector is a Bragg grating, the number of periods in the grating can be increased, to provide increased reflectivity and a narrower wavelength range, or decreased, to provide decreased reflectivity and a wider wavelength range, as needed for a given application. Very high reflectivities such as 99% are not required for a useful bandpass filter (there will generally be a small amount of transmission and some scattering from a Bragg grating). Lower reflectivities simply incur a small loss of optical power. Bragg gratings often include thousands of periods to achieve a useful reflectivity. Layout of a Bragg grating with a larger number of periods will also take up more physical space on the SOI substrate, and the increased cost driven by the larger layout will also be a constraint on such layout. Chirped grating designs, in which grating periodicity varies gradually along the grating length, can also be used for reflectors 108. Chirped gratings can provide a flat top passband (e.g., a small range in which reflectivity is high and nearly constant) and a large out-of-band rejection ratio provided by a steep rolloff at the passband edges. However, chirped gratings are typically several times longer than a single-pitch grating for a given reflectivity.

The predetermined wavelength range reflected by a reflector 108 becomes the passband of the optical bandpass filter. In the embodiment illustrated in FIG. 1, reflectors 108 are identical and are tuned to the same reflection wavelength range, to provide a single design passband. Light from wavelengths outside of the predetermined wavelength range (e.g., non-selected channels) propagates through reflectors 108 and is disposed of One way to dispose of this light is simply to direct it away from the splitter, such as into a waveguide that is configured to direct the light away from the substrate on which the splitter is formed, without generating reflections. Another way is to direct the light into respective optical terminators 504 (e.g., deflectors and/or absorbers; see FIG. 5). A reflection peak of one or both reflectors 108 can be tuned by a thermal heater (or other tuning mechanism) so that the passband of bandpass filter 100 can be adjusted (e.g., to select a desired optical channel).

Figure 1B:
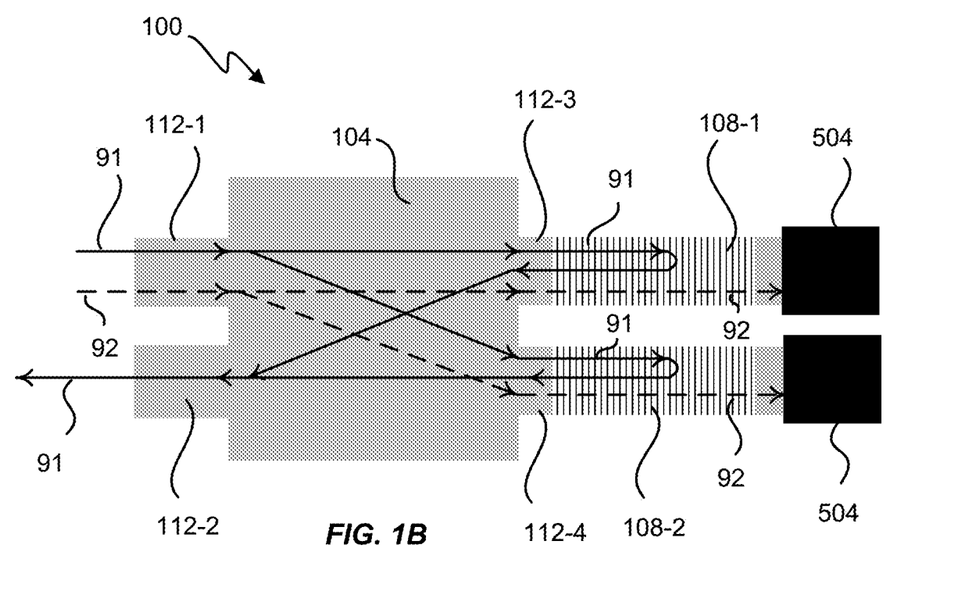
FIG. 1B schematically illustrates paths of reflected and transmitted light within the optical bandpass filter of FIG. 1A, in accord with one or more embodiments.

FIG. 1B schematically illustrates paths of reflected and transmitted light within the optical bandpass filter embodiment schematically shown in FIG. 1A. In use, a multi-carrier (e.g., multi-wavelength and/or multi-channel) optical input may be connected to, or otherwise provide input light to first port 112-1. For discussion purposes, the input light is considered as light 91 of a predetermined wavelength range (e.g., a desired channel) mixed with light 92 of one or more other wavelengths outside of the predetermined wavelength range (e.g., other channels). Light 91 and 92 propagate from first port 112-1 into third port 112-3 and fourth port 112-4 (e.g., operating as a 50/50 splitter) and proceed toward reflectors 108. (Input light 91 and 92 propagate along the same paths within bandpass filter 100 until they reach reflectors 108; the paths of lights 91 and 92 are offset in FIG. 1B only so that they can be visualized separately.) Reflectors 108 are tuned to the wavelength of light 91. Reflectors 108 are tuned to the predetermined wavelength range of light 91 (e.g., the desired passband) as discussed above. Thus, light 91 in the predetermined wavelength range is reflected by reflectors 108 back into optical splitter 104 via third port 112-3 and fourth port 112-4. At least a portion of the reflected light 91 is directed to second port 112-2 and becomes output light. Thus, the output light is effectively filtered by its wavelength-determined reflection from reflectors 108-1, 108-2 such that the output light is bandpass filtered by the operation of bandpass filter 100. Some of light 91 may be directed back into first port 112-1, and not all reflected light 91 may be directed into second port 112-2, but these effects can be managed through layout, as described below in connection with FIGS. 1C and 1D. Light 92 is not reflected by reflectors 108, and passes to optical terminators 504, which absorb light 92.

Figure 1C:
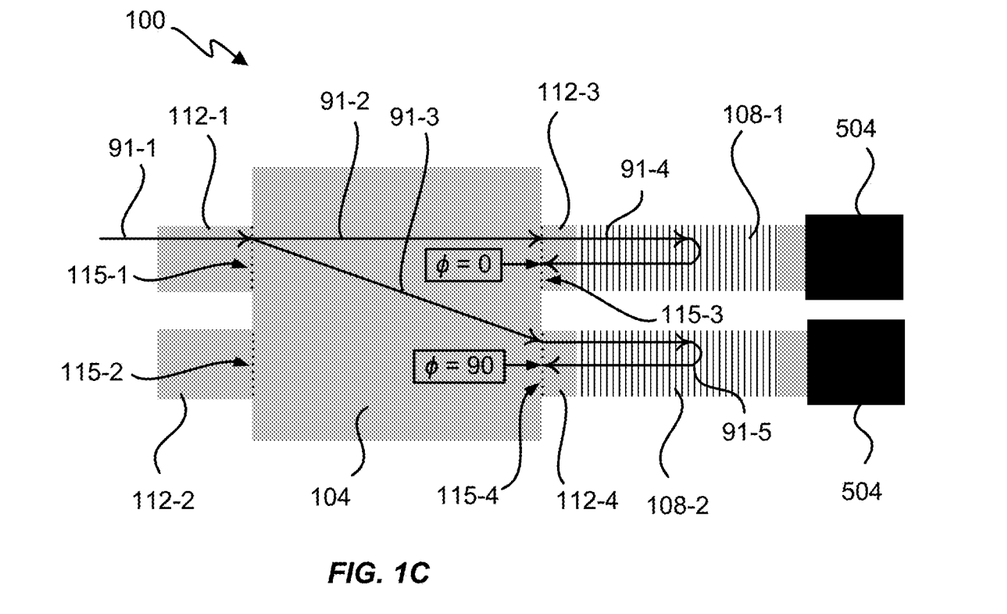
FIG. 1C schematically illustrates phase delays of portions of input light before reflecting within the optical bandpass filter of FIG. 1A, in accord with one or more embodiments.
Figure 1D:
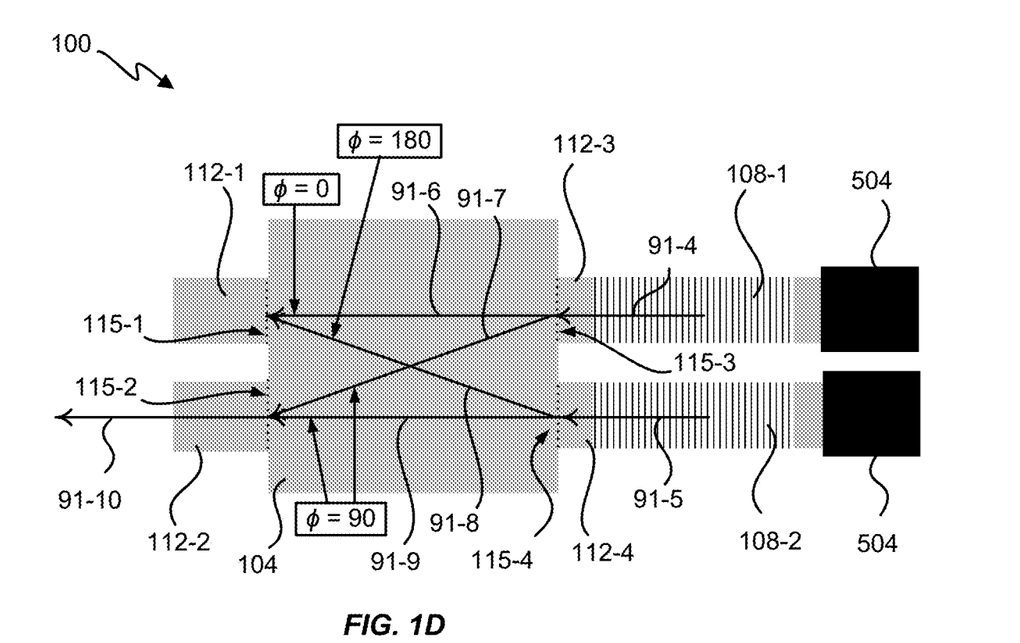
FIG. 1D schematically illustrates phase delays of portions of input light after reflecting within the optical bandpass filter of FIG. 1A, to effectively steer reflected light away from the input port and into the output port, in accord with one or more embodiments.

FIGS. 1C and 1D schematically illustrate how optical bandpass filter 100, FIG. 1A, can be laid out to effectively steer reflected light 91 away from input port 112-1 and instead into output port 112-2, in accord with one or more embodiments. In FIGS. 1C and 1D, only light 91 is shown; light 92 that is outside the predetermined wavelength range is not shown, for clarity of illustration. FIG. 1C illustrates phase delays of portions of light 91 before it reaches reflectors 108, and FIG. 1D illustrates phase delays of portions of light 91 after reflecting from reflectors 108.

In FIG. 1C, input light 91-1 enters through first port 112-1. Within port 112-1, input light 91-1 is constrained by the waveguide geometry of port 112-1 to propagate only along the length of port 112-1. When light 91-1 enters optical splitter 104 at threshold 115-1, light portions designated as 91-2 and 91-3 are unconstrained within the wider geometry of optical splitter 104. Light portions 91-2 and 91-3 propagate toward third port 112-3 and fourth port 112-4 respectively. However, the physical distances from threshold 115-1 to respective thresholds 115-3 and 115-4 of third port 112-3 and fourth port 112-4 are different. Specifically, optical splitter 104 is laid out such that light portion 91-3 is 90 degrees out of phase (e.g., has to travel one-quarter wavelength farther) than light portion 91-2. The distances required within the layout of optical splitter 104 to accomplish this, are the distance across optical splitter 104 (e.g., between thresholds 115-1 and 115-3), the distance between centers of ports 112-3 and 112-4, and the wavelength of light 91-1, as selected by reflectors 108. At thresholds 115-3 and 115-4, light portions 91-2 and 91-3 move into third port 112-3 and fourth port 112-4, and become light portions 91-4 and 91-5 respectively. Third port 112-3 and fourth port 112-4 are laid out identically, so that the 90 degree out-of-phase condition is maintained as light portions 91-4 and 91-5 reflect from reflectors 108-1 and 108-2 back to thresholds 115-3 and 115-4 respectively. Thus, when light portions 91-4 and 91-5 return to thresholds 115-3 and 115-4, they remain 90 degrees out of phase. Relative values of phase φ for light portions 91-4 and 91-5 at thresholds 115-3 and 115-4 are shown in FIG. 1C.

Turning to FIG. 1D, light portions 91-4 and 91-5 are constrained by waveguide geometries to propagate only lengthwise along ports 112-3 and 112-4. Then, upon reaching thresholds 115-3 and 115-4, and passing again into optical splitter 104, each portion is once again unconstrained. From light portion 91-4, light portions 91-6 and 91-7 propagate toward first and second ports 112-1 and 112-2, and from light portion 91-5, light portions 91-8 and 91-9 propagate toward first and second ports 112-1 and 112-2. From the layout conditions noted above, at thresholds 115-3 and 115-4, light portions 91-8 and 91-9 are already 90 degrees behind light portions 91-6 and 91-7. Then, the distances traveled by light portions 91-7 and 91-8 add another 90 degrees of phase delay relative to light portions 91-6 and 91-9 as they cross optical splitter 104. Thus, upon arriving at threshold 115-1, light portion 91-8 will be 180 degrees out of phase with light portion 91-6, so these portions will cancel one another, and essentially no light from these portions enters input port 112-1. However, both light portions 91-7 and 91-9 have been retarded by 90 degrees, and thus these portions are in phase with one another at threshold 115-2. These portions being in phase with one another, essentially all of the light from light portions 91-7 and 91-9 enters output port 112-2 as output light 91-10. Relative values of phase ϕ for light portions 91-6, 91-7, 91-8 and 91-9 at thresholds 115-1 and 115-2 are shown in FIG. 1D.

Thus, by using care in layout, optical splitter 104 can be constructed so as to transmit a very high fraction of input light from the desired wavelength range from input to output, and generate zero or negligible back reflection into input port 112-1. It is possible that small effects due to fabrication can upset the phase relationships noted above, however, it is possible to add phase adjusting devices to bandpass filter 100 to tune the relative phase delays in ports 112-3 and 112-4 so as to bring bandpass filter 100 back to the condition of passing essentially 100% of output light into output port 112-2 with zero or negligible back reflection into input port 112-1 (see FIG. 7, discussed below).

Figure 2:
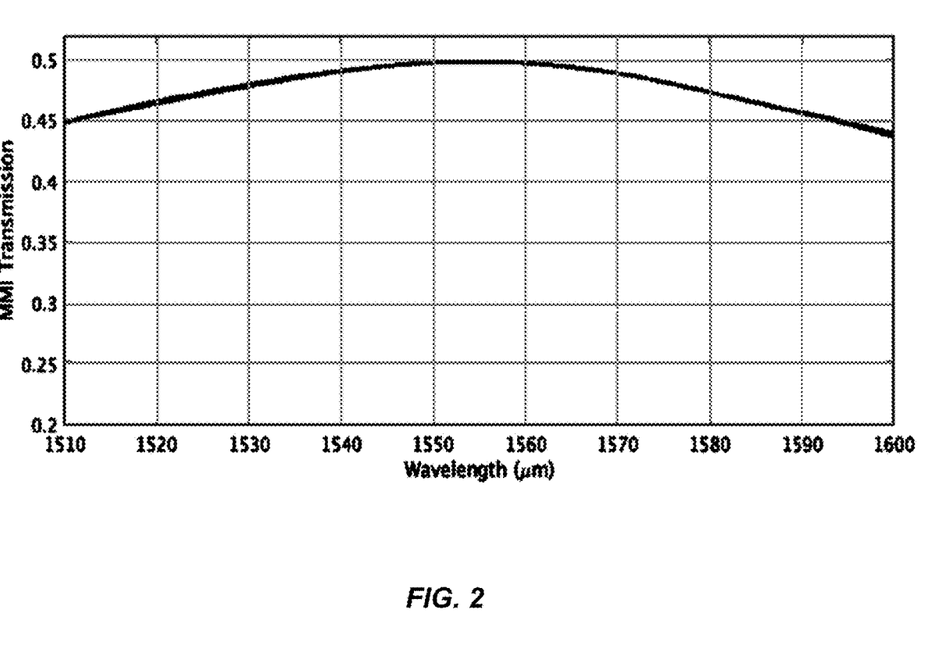
FIG. 2 depicts a sample reflection spectrum of one of the reflectors schematically shown in FIG. 1A, within an optical frequency range of 192.3 THz to 192.7 THz, in accord with one or more embodiments.

FIG. 2 depicts an example transmission spectrum centered around 1554 nm of an embodiment of optical splitter 104, FIG. 1A. It has a very broad bandwidth (85 nm at −0.5 dB, or 45% transmission at each output), which can cover the receiver channels in a PON or other multi-carrier application. Both cross and through transmission are shown, although the two lines cannot be distinguished at the resolution of the plot of FIG. 2 (they are essentially line-on-line). Reflectors 108 and optical splitter 104 can also be designed and fabricated so as to provide very low optical loss. Using thick silicon in an SOI platform can make the bandpass filter 100 polarization insensitive. That is, thick silicon (at least 1 micron thick) confines almost all (e.g., >90%) of optical modes within the Si layer around the desired wavelengths (e.g., the wavelength range illustrated in FIG. 2). Thin silicon, on the other hand, may confine only around 40% of the optical modes within the Si layer, so that the effective optical index for TE and TM polarization modes are very different due to their different mode shapes.

Figure 3:
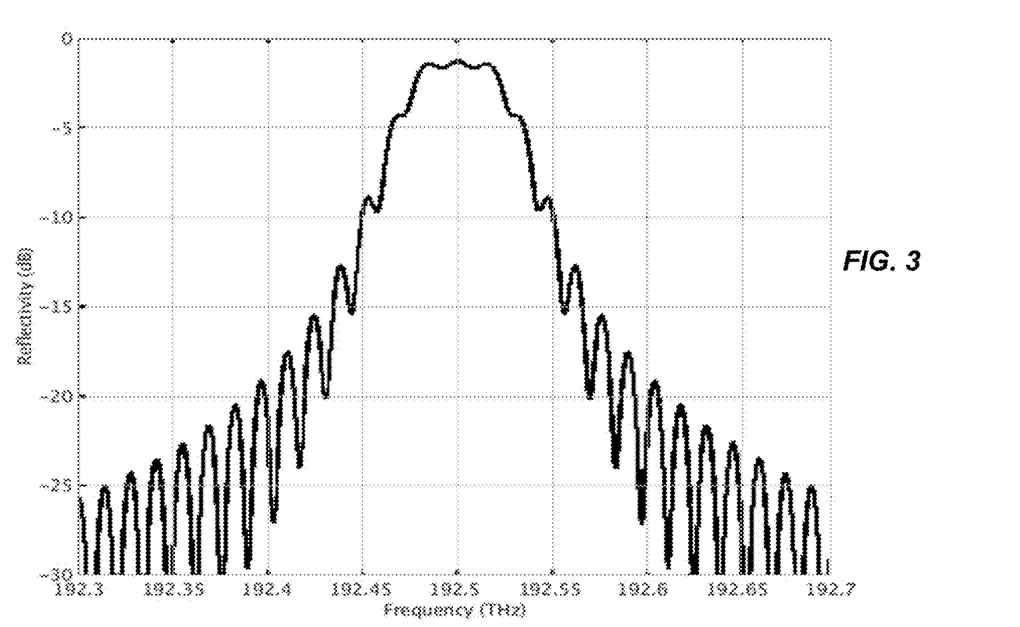
FIG. 3 depicts a sample reflection spectrum of one of the reflectors schematically shown in FIG. 1A, within an optical frequency range of 192.3 THz to 192.7 THz, in accord with one or more embodiments.
Figure 4:
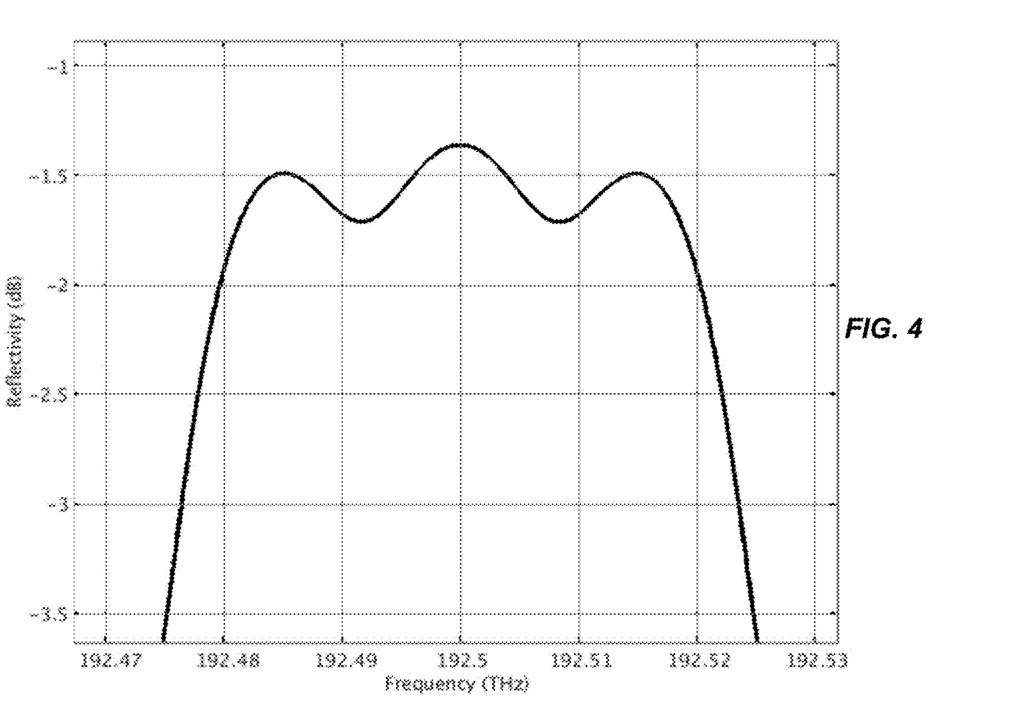
FIG. 4 is a detailed view of a portion of the reflection spectrum shown in FIG. 3, within an optical frequency range of 192.47 THz to 192.53 THz.

FIGS. 3 and 4 depict a sample reflection spectrum of an embodiment of reflector 108 as illustrated in FIG. 1. The reflection spectrum is centered at 192.50 THz (1557.4 nm). The grating is designed with a chirped grating pitch. The reflection spectrum has about a 40 GHz bandwidth (measured at −0.5 dB), which, considered as a channel, provides about 18 dB rejection ratio of adjacent channels (e.g., for 100 GHz/0.8 nm channel spacing).

Figure 5:
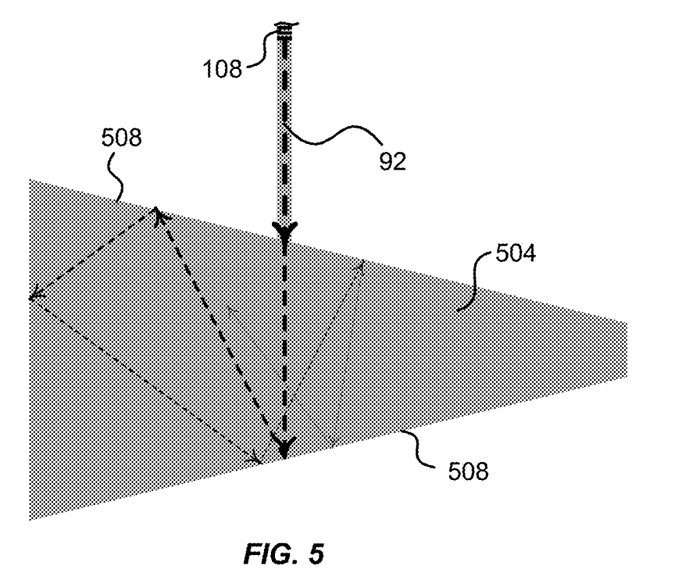
FIG. 5 schematically depicts an embodiment of an optical terminator 504, in accord with one or more embodiments.

FIG. 5 schematically depicts an embodiment of an optical terminator 504. Light that passes through the reflector 108 is optically coupled with optical terminator 504. Optical terminator 504 includes walls 508 that are skewed (e.g., non-parallel and non-perpendicular) with respect to each other and/or to reflector 108. The walls 508 are a deflective structure so that light 92 that passes through reflector 108 bounces around within optical terminator 504, and is unlikely to reflect back toward the reflector 108 after having passed through the reflector 108. Although the path of light 92 is indicated as a straight line, it is understood that light 92 will also diffract within optical terminator 504, making it even less likely that a significant amount of light 92 will reflect back toward reflector 108. In certain embodiments, absorptive material is used in addition to, or in lieu of, deflection. Care may be taken in layout of, and materials used to form, optical terminator 504 to assure that heat generated by the absorption of light 92 is properly dissipated without undue influence on adjacent components.

Figure 6:
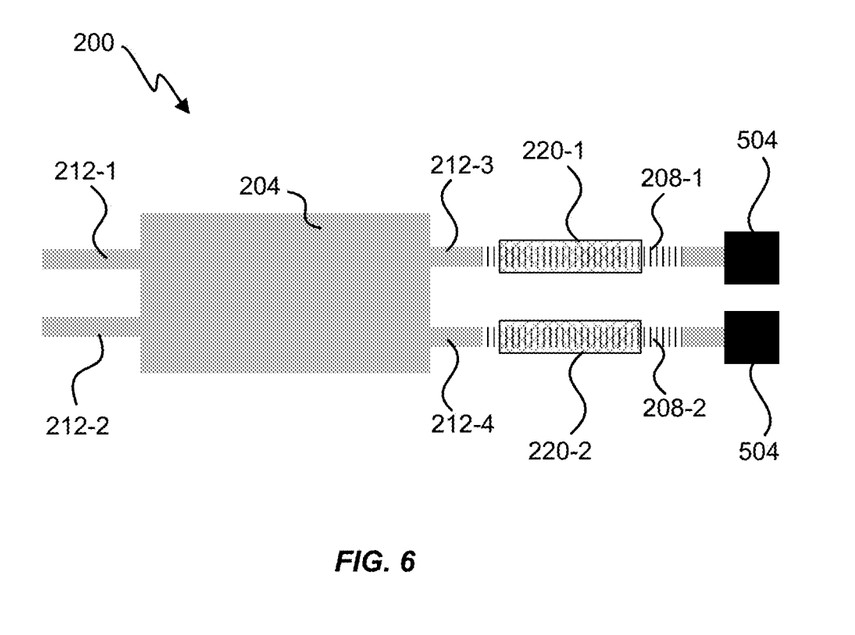
FIG. 6 schematically depicts an embodiment of an optical bandpass filter that includes optional tuning devices that can adjust reflection peaks of reflectors with which the tuning devices are respectively associated, in accord with one or more embodiments.

Two important enhancements to the optical bandpass filters discussed above involve use of tuning mechanisms, either to tune wavelength selection (e.g., to select among optical communication channels in a multi-wavelength, multi-channel system) or to minimize optical losses and back reflections. FIG. 6 schematically depicts an embodiment of an optical bandpass filter 200 that includes optional tuning devices 220-1, 220-2. Optical bandpass filter 200 includes components that may be similar or identical to those shown in optical bandpass filter 100, FIGS. 1A, 1B, and arranged similarly and having similar functions. These components include an optical splitter 204, first reflector 208-1, second reflector 208-2, a first port 212-1, a second port 212-2, a third port 212-3, a fourth port 212-4, and optical terminators 504. In optical bandpass filter 200, optional tuning devices 220-1, 220-2 can adjust the wavelengths of the reflection peaks of reflectors 208-1, 208-2, with which optional tuning devices 220-1, 220-2 are respectively associated. Optional tuning devices 220-1, 220-2 may be, for example, thermal heaters. Some embodiments include only one tuning device 220-1 or 220-2, while other embodiments feature both. The use of heaters as tuning devices is exemplary only; other tuning mechanisms include current injection tuning through a forward-biased PN or PIN diode, voltage tuning through a reverse-biased diode, or incorporating other electro-optical materials such as polymers, LiNBO$_3$ or the like, in the waveguides of ports 212. Some of these mechanisms may be much faster than heater-based control, but may incur larger optical losses.

Figure 7:
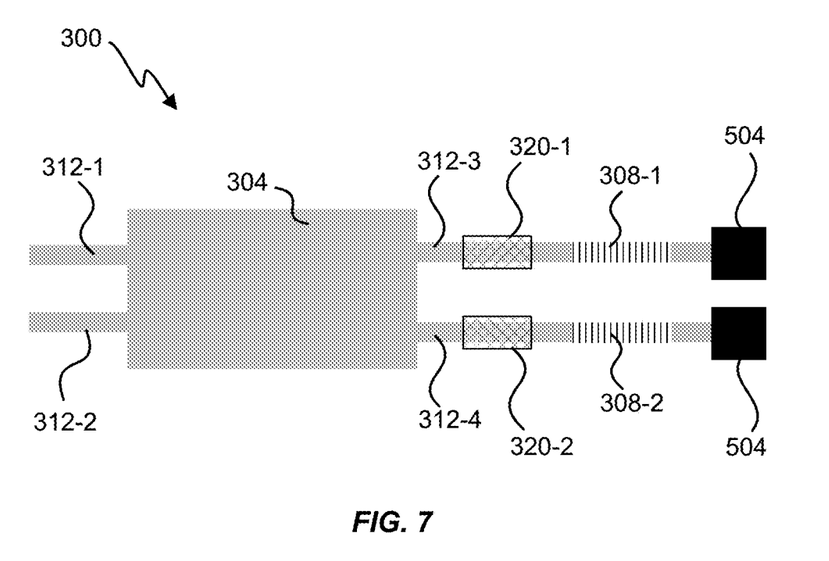
FIG. 7 schematically depicts an optical bandpass filter that includes optional tuning devices fine tune a phase difference between light reflected from reflectors in different ports, to optimize performance of the optical filter, in accord with one or more embodiments.

In these and other embodiments, tuning mechanisms can adjust phase delays within waveguides between the reflectors 108 and optical splitter 104, to fine tune a phase difference between light waves reflected from the two reflectors 108. This phase fine tuning can be used to optimize performance by compensating for asymmetry between two waveguides (e.g., waveguides associated with the third port 112-3 and the fourth port 112-4) induced by fabrication, or to otherwise direct the propagation of either input or reflected light passing through optical splitter 104. FIG. 7 schematically depicts an embodiment of an optical bandpass filter 300 that includes optional, optical tuning devices 320-1, 320-2. Optical bandpass filter 300 includes components that may be similar or identical to those shown in optical bandpass filter 100, FIGS. 1A, 1B, and optical bandpass filter 200, FIG. 6, arranged similarly and having similar functions. These components include an optical splitter 304, first reflector 308-1, second reflector 308-2, a first port 312-1, a second port 312-2, a third port 312-3, a fourth port 312-4, and optical terminators 504. In optical bandpass filter 300, optional, optical tuning devices 320-1, 320-2 are capable of adjusting optical lengths of third port 312-3 and fourth port 312-4, with which tuning devices 320-1, 320-2 are respectively associated. Optional, optical tuning devices 320-1, 320-2 may be, for example, thermal heaters, and may optionally be included in either third port 312-3, fourth port 312-4, or both; similarly, a single optical tuning device may be associated with both third port 312-3 and fourth port 312-4. Thus, optional, optical tuning devices 320-1, 320-2 can be used, for example, to fine tune a phase difference between light reflected from reflectors 308-1, 308-2, to optimize optical throughput and minimize back reflections into the input port of optical filter 300. Note that optional, optical tuning devices 320-1, 320-2 are located in different places and provide different effects than optional tuning devices 220-1, 220-2, FIG. 6. Any combination of optional tuning devices 220-1, 220-2, 320-1, 320-2 can be fabricated and/or utilized to adjust performance of associated optical bandpass filters such as described herein. The same tuning mechanisms (besides heaters) discussed above in connection with FIG. 6 may also be employed for optical tuning devices 320-1, 320-2.

Figure 8:
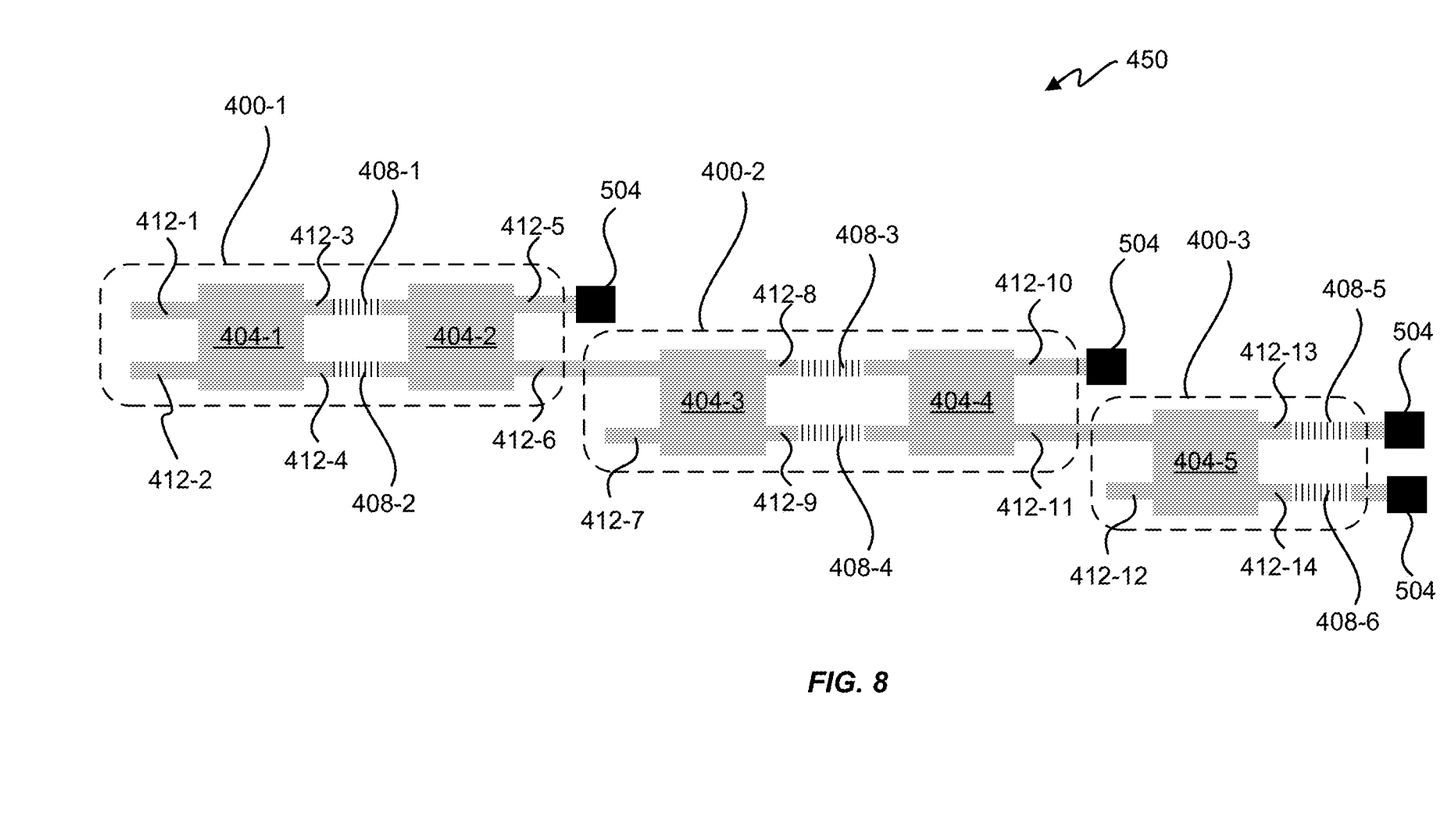
FIG. 8 schematically illustrates a passive optical component that extracts light of multiple wavelength ranges from a single input, in accord with one or more embodiments.

With appropriate adjustments, optical bandpass filters of the type described above can be treated as building blocks that can be cascaded, to extract light of multiple wavelength ranges (e.g., optical channels) from a single input. For example, FIG. 8 schematically illustrates a passive optical component 450 that extracts light of multiple wavelength ranges from a single input. Generally speaking, passive optical component 450 acts as a series of bandpass filters. A first bandpass filter 400-1 selectively filters light of a first predetermined wavelength range into a first output, while passing the rest of the light received as input to a second bandpass filter 400-2. Second bandpass filter 400-2 selectively filters the light of a second predetermined wavelength range into a second output, while passing the rest of the light received as input to a third bandpass filter 400-3. This process can be repeated almost indefinitely, although optical losses in each bandpass filter will eventually make the outputs weaker as the process continues. The operation of passive optical component 450 is now described in detail.

First bandpass filter 400-1 includes two optical splitters 404-1 and 404-2, an input port 412-1, a first output port 412-2, a third port 412-3, a fourth port 412-4, reflectors 408-1 and 408-2 associated with third port 412-3 and fourth port 412-4 respectively, and two further output ports 412-5 and 412-6. Optical splitters 404-1 and 404-2 may be multimode interference couplers. Bandpass filter 400-1 operates much like bandpass filter 100, FIG. 1A, accepting input light through input port 412-1, distributing portions of the input light to third port 412-3 and fourth port 412-4, reflecting portions of light in a first predetermined wavelength range at reflectors 408-1 and 408-2, and recombining the reflected light portions as output light emitted into output port 412-2. Phase relationships among ports 412-1, 412-2, 412-3, and 412-4 are managed as illustrated in FIGS. 1C and 1D to force all of the output light into output port 412-2 and keep it from reflecting into input port 412-1. However, light outside the first predetermined wavelength range is not dumped into absorbers or emitted away from the apparatus; this light instead passes into a second optical splitter 404-2, which acts as a combiner, allowing interference among the two light portions as they pass toward further output 412-5 and 412-6.

From the discussion of FIG. 1C above, the phase of the light in fourth port 412-4 will be 90 degrees behind that in third port 412-3. Optical splitter 404-2 is laid out similarly to optical splitter 404-1 in that paths directly across the splitter (e.g., from port 412-3 to 412-5, or from port 412-4 to 412-6) will introduce a first phase delay, while diagonal paths across the splitter (e.g., from port 412-3 to 412-6, or from port 412-4 to 412-5) will introduce a first phase delay plus 90 degrees. Thus, the light that arrives at output port 412-5 will include portions that are 180 degrees out of phase, so that they cancel. The light that arrives at output port 412-6 will include portions that are in phase—one portion from fourth port 412-4, with a 90 degree delay with respect to the input light at port 412-1, and a second portion from third port 412-3, with a 90 degree delay added by the traversal of optical splitter 404-2. Thus, to achieve maximum output strength of the light outside of the first predetermined wavelength range of reflectors 408-1 and 408-2, the second optical splitter 404-2 is added to add phase delay to the light portion from one output port of the first optical splitter 404-1, then combine it with the light portion from the other output port. These portions then pass together into output port 412-6, as input to the next bandpass filter 400-2. Output port 412-5 should see zero light output, because of the destructive interference of the two light portions that arrive there, but an optical terminator 504 may be added to ensure no back reflection of any stray light that may be present.

Optical bandpass filter 400-2 includes similar components to those of bandpass filter 400-1, namely two optical splitters 404-3 and 404-4, input port 412-6 (from bandpass filter 400-1), a first output port 412-7, a third port 412-8, a fourth port 412-9, reflectors 408-3 and 408-4 associated with third port 412-8 and fourth port 412-9 respectively, and two further output ports 412-10 and 412-11. In filter 400-2, reflectors 408-3 and 408-4 are tuned to the second predetermined wavelength range so that after reflection and recombination within optical splitter 404-3, light in the second predetermined wavelength range passes to output port 412-7. Light portions that pass through reflectors 408-3 and 408-4 are recombined in optical splitter 404-4 to pass into output port 412-11 for further processing. Any waste light that is present at output port 412-10 may pass into an optical terminator 504.

The processes of splitting, reflecting, recombining reflected light into one output port, and recombining nonreflected light portions into another output port, can be continued by adding further bandpass filters 400 with differently tuned optical reflectors. A final bandpass filter 400-3 includes only one optical splitter 404-5, an input port 412-11 (from second bandpass filter 400-2), an output port 412-2, a third port 412-13 and associated reflector 408-5, and a fourth port 412-14 and associated reflector 408-6. In final bandpass filter 400-3, where nonreflected light is not going to be further processed, input light from preceding filter 400-2 can be processed with a single optical splitter 404-5, with all nonreflected light being disposed of, optionally using optical terminators 504. That is, optical filter 400-3 operates exactly like bandpass filter 100, FIG. 1A.

All of the tuning mechanisms discussed above, including wavelength tuning of reflectors 408 and phase delay tuning of various ports, may be implemented in passive optical component 450 to select or fine tune desired wavelength ranges, or optimize phase delays for maximum output and minimum back reflection.

The specific details of particular embodiments may be combined in any suitable manner without departing from the spirit and scope of embodiments of the invention. However, other embodiments of the invention may be directed to specific embodiments relating to each individual aspect, or specific combinations and/or extensions of these individual aspects. For example, although an optical passband filter based on a multimode interference coupler is described, it is possible to substitute other splitters/combiners for the multimode interference coupler. Similarly, it is possible for such splitters/combiners to have any number of ports that may include additional inputs, additional outputs, and/or additional ports coupled with wavelength-selective reflectors and optical terminators. Upon reading and comprehending the present disclosure, one of ordinary skill in the art will readily conceive many equivalents, extensions, and alternatives to the specific, disclosed examples, all of which are within the scope of embodiments herein.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Accordingly, the present invention is not limited to the embodiments described above or depicted in the drawings, and various embodiments and modifications can be made without departing from the scope of the claims below. Also, it is noted that embodiments herein may be described as a process which is depicted as a flowchart, a flow diagram, a data flow diagram, a structure diagram, or a block diagram. Although a flowchart may describe the operations as a sequential process, some of the operations may be performed in parallel, concurrently, or repeatedly. In addition, the order of the operations may be re-arranged. A process is terminated when its operations are completed, but could have additional steps not included in the figure.

A recitation of "a," "an," or "the" is intended to mean "one or more" unless specifically indicated to the contrary.

All patents, patent applications, publications, and descriptions mentioned here are incorporated by reference in their entirety for all purposes. None is admitted to be prior art.

We claim:

1. An optical bandpass filter, comprising:
    an optical splitter having at least four ports, a first one of the ports being designated as an input port and a second one of the ports being designated as an output port;
    a first reflector operatively coupled with a third one of the ports;
    a second reflector operatively coupled with a fourth one of the ports;
    an optical terminator that is configured to absorb light transmitted thereto; and
    an optical tuning device between the third one of the ports and the first reflector, the optical tuning device configured to adjust an optical length of light propagating from the optical splitter to the first reflector;
    wherein:
    the optical splitter is configured to:
        accept input light through the input port,
        direct at least a first portion of the input light into the third one of the ports, such that the first portion of the input light propagates toward the first reflector,
        direct at least a second portion of the input light into the fourth one of the ports, such that the second portion of the input light propagates toward the second reflector; and
    the first and second reflectors are configured to:
        reflect light having wavelengths within a predetermined wavelength range, to propagate back toward the optical splitter, as wavelength-selected light, and
        transmit light having wavelengths that are outside of the predetermined wavelength range, away from the optical splitter;
    the optical terminator is optically coupled with at least one of the first or second reflectors so that the light having wavelengths outside of the predetermined wavelength range is transmitted into, and absorbed by, the optical terminator; and
    the optical splitter is configured to direct at least a portion of the wavelength-selected light that propagates back toward the optical splitter, into the output port, as output light.

2. The optical bandpass filter of claim 1, wherein the first and second reflectors are Bragg gratings.

3. The optical bandpass filter of claim 1, wherein the first and second reflectors have a reflectance bandwidth equal to or less than 40 GHz, measured at −0.5 dB.

4. The optical bandpass filter of claim 1, wherein the first and second reflectors comprise chirped gratings.

5. The optical bandpass filter of claim 1, further comprising a heater, where the heater is configured to tune a reflectance spectrum of both the first and second reflectors.

6. The optical bandpass filter of claim 1, wherein the optical splitter is a multimode interferometer.

7. The optical bandpass filter of claim 6, wherein the optical splitter is a 2×2 multimode interferometer that is configured to:
    add a first phase delay to light that is directed from the input port to the third one of the ports;
    add a second phase delay to light that is directed from the input port to the fourth one of the ports, the second phase delay being equal to the first phase delay plus 90 degrees;
    add a third phase delay to reflected light that is directed from the third one of the ports to the output port, the third phase delay being equal to the first phase delay plus 90 degrees; and
    add a fourth phase delay to reflected light that is directed from the fourth one of the ports to the output port, the fourth phase delay being equal to the first phase delay.

8. The optical bandpass filter of claim 1, wherein:
    the optical tuning device is a first optical tuning device; and
    the optical bandpass filter further comprises a second optical tuning device between the fourth one of the ports and the second reflector, the second optical tuning device configured to adjust an optical length of light propagating from the optical splitter to the second reflector.

9. The optical bandpass filter of claim 8, wherein the optical tuning device is a heater.

10. An optical bandpass filter comprising:
    a splitter formed of silicon on an SOI substrate, the splitter comprising:
        a first port, wherein the first port is a silicon waveguide that acts as an input to the optical bandpass filter;
        a second port, wherein the second port is a silicon waveguide that acts as an output of the optical bandpass filter;
        a third port, wherein the third port is a silicon waveguide; and
        a fourth port, wherein the fourth port is a silicon waveguide;
    a first wavelength-sensitive reflector optically coupled with the third port;
    a second wavelength-sensitive reflector optically coupled with the fourth port;
    an optical tuning device between the third port and the first wavelength-sensitive reflector, the optical tuning device configured to adjust an optical length of light propagating from the splitter to the first, wavelength-sensitive reflector, wherein:
        the splitter directs at least a portion of input light to the third and fourth ports;
        the first and second wavelength-sensitive reflectors reflect light within a predetermined wavelength range back toward the splitter as reflected light; and
        the splitter directs at least a portion of the reflected light into the second port as output light; and
        the first wavelength-sensitive reflector is a Bragg grating that reflects the light within the predetermined wavelength range back toward the splitter, and allows light having wavelengths outside the predetermined wavelength range to pass through the Bragg grating and propagate away from the splitter; and an optical terminator arranged to absorb the light having wavelengths outside the predetermined wavelength range.

11. The optical bandpass filter of claim 10, wherein the light having wavelengths outside the predetermined wavelength range propagates away from the splitter into a waveguide that is configured to project the light away from the SOI substrate.

12. The optical bandpass filter of claim 10, wherein the second wavelength-sensitive reflector is identical to the first wavelength-sensitive reflector.

13. The optical bandpass filter of claim 10, wherein the splitter is a multimode interferometer.

14. The optical bandpass filter of claim 10, further comprising a first heater and a second heater, wherein:
the first heater is configured to tune a first peak reflectance of the first wavelength-sensitive reflector; and
the second heater is configured to tune a second peak reflectance of the second wavelength-sensitive reflector.

15. The optical bandpass filter of claim 10, further comprising a heater configured to tune both a peak reflectance of the first wavelength-sensitive reflector and a peak reflectance of the second wavelength-sensitive reflector.

16. A method of bandpass filtering an optical communication channel, the method comprising:
coupling input light into an optical splitter;
directing, with the optical splitter, at least a portion of the input light toward one or more reflectors;
adjusting an optical length of light propagating from the optical splitter toward the one or more reflectors, using one or more optical tuning devices between the optical splitter and the one or more reflectors;
reflecting, by the one or more reflectors, wavelengths of the portion of the input light that are within a predetermined wavelength range, back toward the optical splitter, as wavelength-selected light;
transmitting to one or more optical terminators, by the one or more reflectors, light wavelengths that are outside of the predetermined wavelength range, away from the optical splitter; and
directing, by the optical splitter, at least a portion of the wavelength-selected light into an output of the optical splitter, as bandpass filtered output light.

17. The method of claim 16, wherein reflecting light comprises reflecting light using a Bragg grating.

18. The optical bandpass filter of claim 1, wherein the optical terminator comprises walls that are skewed with respect to each other.

19. The optical bandpass filter of claim 1, wherein:
the optical terminator is a first optical terminator;
the first optical terminator is optically coupled with the first reflector;
the optical bandpass filter comprises a second optical terminator; and
the second optical terminator is optically coupled with the second reflector.

20. The method of claim 16, wherein the one or more optical terminators have absorptive material.

\* \* \* \* \*